July 23, 1963 G. FRIESE 3,098,886
PROCESS FOR PRODUCING HYDRAULIC LIMES FROM OIL SHALE
Filed April 5, 1961
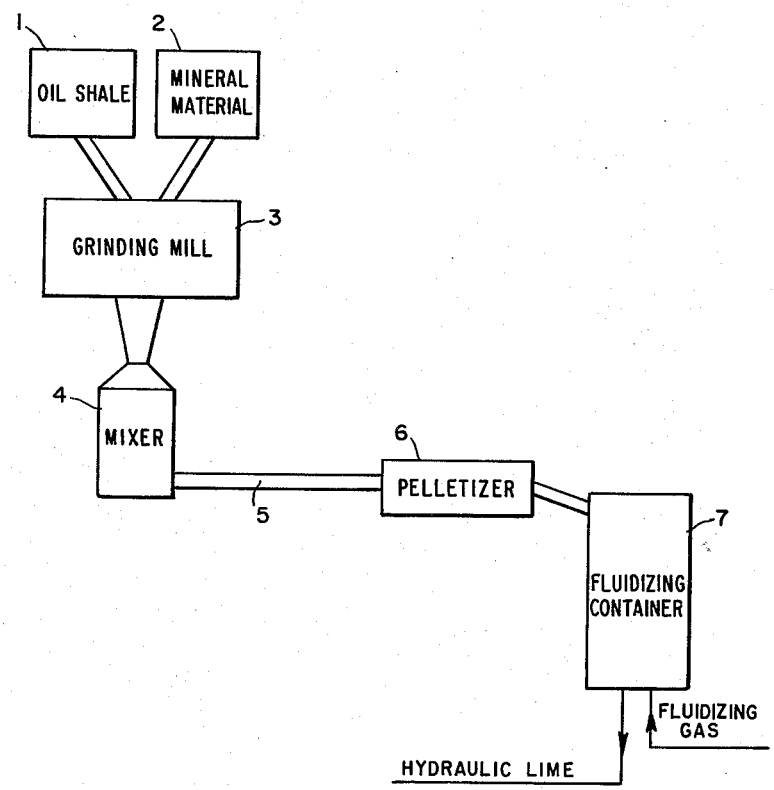
INVENTOR:
GÜNTER FRIESE
BY Burgen, Dinklage & Sprung
ATTORNEY 3,098,886
PROCESS FOR PRODUCING HYDRAULIC
LIMES FROM OIL SHALE
Günter Friese, Frankfurt am Main, Germany, assignor to
Metallgesellschaft A.-G., Frankfurt am Main, Germany, a German corporation
Filed Apr. 5, 1961, Ser. No. 100,818
Claims priority, application Germany Apr. 14, 1960
7 Claims. (Cl. 263—53)

The instant invention relates to a process for preparing hydraulic limes by heat treatment at elevated temperatures of oil shale, and more particularly the invention relates to a process for preparing hydraulic limes by carrying out the heat treatment of the oil shale in an admixture with mineral material, which admixture has been pre-treated for pelletization thereof.

It is already known to obtain from oil shale, the chief inorganic constituent of which is marl, by roasting or calcining in order to eliminate the organic substances present in the composition, a hydraulic lime. According to a process which has not as yet been available to the art, the the oil shale may be treated in a fluidized bed furnace whereby the organic substances present in the oil shale are not eliminated by roasting or calcining but, rather, are burned in the presence of an oxygen-containing gas whereby the organic constituents of the oil shale are oxidized.

The strength and setting properties of the limes thereby obtained are, however, entirely dependent on the natural mineral composition and structure of the oil shale so processed. If starting oil shale materials having unfavorable compositions are subjected to the calcining or, alternatively, the combusting procedures, the final products obtained are generally possessed of unsatisfactory strength and setting characteristics.

It has already been proposed to regulate the composition of the starting material by addition of such materials as lime, clay, chalk, and the like to the oil shale in sufficient quantity to achieve the desired value of inorganic constituents in the final composition of the mixture before the same is subjected to heat treatment at elevated temperatures in the fluidized bed furnace in order that a product having more advantageous strength and setting properties be finally obtained. However, these attempts have been only slightly successful, if at all, in achieving the desired results.

An object of the instant invention is the preparation of hydraulic lime by heat treatment at elevated temperature of oil shale, avoiding the above and other inherent disadvantages of the methods heretofore practiced.

Another object of the invention is the preparation of hydraulic lime by heat treatment at elevated temperature of oil shale wherein the heat freed in the thermal treatment is recovered for further utilization.

Still another object of the invention is the preparation of hydraulic lime, characterized by satisfactory strength and setting properties, from oil shales having compositions per se mitigating against the obtaining of such results.

These and other objects will be made apparent from a study of the within specification and drawing.

The drawing shows the typical lime plant used to practice the method.

In accordance with the invention, it has now been found that hydraulic lime possessed of highly favorable properties and characteristics can be prepared from mixtures of oil shale and mineral materials, such as lime, clay, chalk, etc., which have been pre-treated by finely grinding the oil shale and mineral material singly or in combination to produce particles having a size of about 0.1 mm. or less, and pelletizing the intimate particulate admixture prior to thermal treatment thereof in a fluidized bed furnace.

The pelletizing is effected in the conventional manner, employing therefor apparatus of known construction, such as, for example, granulating drums or granulating plates. Preferably, the size of the pellets lies within the range of from about 2 to 10 mm. and most preferably between about 5 and 7 mm.

The oil shale and mineral material are fed separately or in combination from tanks 1 and 2 respectively into grinding mill 3. In the grinding mill the oil shale and mineral material are finely ground to produce particles having a size of about 0.1 mm. or less. The solid particles are intimately mixed in mixer 4 and the intimate mixture passed through conduit 5 into the pelletizer 6. From the pelletizer 6 the pellets are heat treated in a fluidizing container 7.

In some instances depending on the starting oil shale material employed, there is obtained forthwith and without any further additions pellets which, after drying, have sufficient strength for further processing, i.e., heat treatment at elevated temperatures in a fluidized bed in accordance with the invention. Pellets prepared from oil shale materials in which such is not the case may be further strengthened by addition thereto of strength-increasing agents, such as, for example, burnt lime, cement, bentonite or black, spent or waste liquor.

The pellets so prepared are thereupon fed into a fluidized bed furnace and subjected therein to treatment at elevated temperatures in excess of 400° C., whereby the organic constituents of the pellets are eliminated. The heat treatment may be a roasting or calcining carried out by passing a hot inert gas upwardly through the oil shale-mineral material pellets at a velocity sufficient to suspend the material in fluidized condition. Alternatively and preferably, the elimination of the organic constituents takes place through a combustion reaction, there being utilized in this connection, as fluidizing gas, an oxygen-containing gas as, for example, air, oxygen or a mixture of both, the oxygen being present in an amount sufficient to substantially completely oxidize the organic constituents present in the shale.

The heat produced in the combustion is advantageously utilized for the generation of steam either for use in the process or any other installations. Suitable cooling pipes may be disposed about the exterior of the fluidized bed apparatus and also in some cases within the fluidized bed portion itself. These cooling pipes actually serve as heat exchange means for the generation of steam used preferably in connection with other contingent plant operations.

In accordance with a further embodiment of the invention, the strength of the pellets fed into the fluidized bed furnace is so regulated that during the treatment in the fluidized bed furnace they disintegrate either entirely or in part. The finely calcined or combusted product is in this connection discharged as a fine dust and is separated in the conventional manner in an after-connected separation device such as, for example, a cyclone. The aforesaid embodiment results in a considerable economy since, otherwise, the subsequently required pulverizing costs may be at least in part eliminated.

*Example I.—A Prior Art*

An oil shale of the following composition was treated:

| | |
|---|---|
| Ignition loss | 6.8%. |
| $SiO_2$ | 24.9%. |
| $Fe_2O_3$ | 9.4%. |
| $Al_2O_3$ | 5.6%. |
| CaO | 21.3%. |

| | |
|---|---|
| MgO | 1.4%. |
| TiO$_2$ | 0.44%. |
| P$_2$O$_5$ | 0.06%. |
| SO$_3$ | 8.75%. |
| (S) | (3.5%). |
| C total | 9.95%. |
| C fix | 7.36%. |
| C as CO$_2$ | 2.6%. |
| CO$_2$ | 9.5%. |
| Oil content | 3.0%. |
| Gas | 3.1%. |
| Calorie value | 923 Kcal./kg. |

The oil shale as received from the quarry consisted of pieces from fist- to head-size. It was broken up in a disintegrator to a size of 40 to 60 mm. and then ground up to a particle size of less than 10 mm.

The ground oil shale was charged to a fluid bed furnace of 2.5 sq. m. grate area and with a hight of 8 m. The throughput was 85 tons per 24-hour day. The air used amounted to 7.500 Nm.$^3$/h. The temperature within the fluid bed was 750° C., the temperature at flue gas exit 850° C. The mean dwell time of the particles within the bed was 20 minutes.

The flue gas had a content on CO$_2$ of 8 to 12%, its oxygen content was 8 to 10%, the rest nitrogen. The flue gases were charged with 850° C. into a boiler and left this boiler with 190° C. Within the boiler 3 tons steam p.h. were produced with a pressure of 35 atmospheres gauge and a temperature of 380° C. The solid discharge from the fluid bed was practically free of organic matter and had an ignition loss of 2% at 1.000° C. The discharge was ground up in a ball mill to cement fineness. Samples made from this material had a crushing strength of 140 kg./sq. cm. after 4 weeks.

*Example II.—Instant Invention*

The same oil shale as in Example I was ground up to a particle size of less than 0.1 mm. and mixed with 10% limestone with a content on CaCO$_3$ of 95%, which was also ground up to a particle size of less than 0.1 mm. The mixture was thoroughly homogenized in a drum mixer and pelletized on a pelletizing disk with a diameter of 1.4 m. to pellets with a grain size of 6 to 10 mm. under addition of 10% spent sulphite liquor. The pellets were charged into the same fluid bed furnace as in Example I.

The throughput was 92 tons per 24-hour day, the amount of air used 7.500 Nm.$^3$/h., the temperature within the fluid bed 760° C., the temperature at the flue gas exit 840° C. The CO$_2$ content of the flue gas was 8 to 12%, the oxygen content 8 to 10%. The steam production amounted as in Example I to 3 tons p.h. of steam with a pressure of 35 atmospheres gauge and a temperature of 380° C. The discharge from the furnace consisted predominantly of pellets of the same size as the charged ones, had an ignition loss of 3 to 3.5% at 1.000° C. and was practically free of organic matter. It was ground up to cement fineness. Samples made from this material had a crushing strength of 210 kg./sq. cm. after 4 weeks.

*Example III.—This Invention Modification According to Claim 7*

Essentially the same conditions as in Example II were maintained with the alteration that not 10, but only 5% sulphite liquor was added to the pellets. Under these conditions the pellets disintegrated within the fluid bed to a fine powder, which needed only some after grinding in a ball mill in order to reduce it to cement fineness. The samples made from this material had the same crushing strength as the ones obtained in Example II, i.e. 210 kg./sq. cm. after 4 weeks.

I claim:

1. In a process for preparing hydraulic lime by heat treating at elevated temperature a mixture of oil shale and mineral material said mixture containing limestone and some silica and alumina, the quantities of the components of the mixture being regulated so as to produce a hydraulic lime having optimum strength characteristics, the improvements which comprise grinding oil shale and a mineral material to a particle size of less than 0.1 mm., treating the finely ground oil shale and mineral material to form an intimate admixture thereof, treating the resulting admixture to form therefrom pellets having a diameter of from about 2 to 10 mm., thereafter fluidizing said pellets at an elevated temperature using as fluidizing gas an oxygen-containing gas igniting the fluidized pellets and thereby combusting the organic constituents of the oil shale, and recovering the hydraulic lime free of organic constituents.

2. Improvement according to claim 1, wherein the fluidizing is effected at a temperature in excess of 400° C.

3. Improvement according to claim 1 wherein there is incorporated into said pellets additional materials capable of increasing the strength thereof.

4. Improvement according to claim 3, wherein said additional material is selected from the group consisting of burnt lime, cement, bentonite and spent liquor.

5. Improvement according to claim 1, which comprises regulating the quantities of the components of the mixture so as to produce pellets which will at least in part disintegrate into fine powdery granules during said heat treatment.

6. Improvement according to claim 1, wherein said pellets have a size within the range of about 5–7 mm.

7. Improvement according to claim 1, recovering the heat liberated in the combustion of the organic constituents using the recovered heat to convert water to steam.

References Cited in the file of this patent

UNITED STATES PATENTS

| | | |
|---|---|---|
| 1,366,479 | Newberry | Jan. 25, 1921 |
| 1,504,702 | Newberry | Aug. 12, 1924 |
| 2,409,707 | Roetheli | Oct. 22, 1946 |
| 2,687,290 | Garoutte et al. | Aug. 24, 1954 |
| 2,904,445 | Sellers et al. | Sept. 15, 1959 |

FOREIGN PATENTS

| | | |
|---|---|---|
| 639,228 | Great Britain | June 21, 1950 |